United States Patent
Cordell et al.

(10) Patent No.: US 8,918,360 B2
(45) Date of Patent: *Dec. 23, 2014

(54) MACHINE CHANGE HISTORY TRACKING PROCESS FOR ERP APPLICATIONS

(71) Applicant: International Business Machines Corporation, Armonk, NY (US)

(72) Inventors: Edward Cordell, Clifton Park, NY (US); Mark W. Honeck, Kissimmee, FL (US); Joachim Lohmiller, Ehnin (DE); Susan L. Merkle, Loveland, OH (US); Jan Nielsen, Frederick, MD (US); Paul Noga, Gaithersburg, MD (US); William J. Reilly, Cary, NC (US); John J. Roberts, Chester, NY (US); Siegfried F. Sanders, Clayton, NC (US); Thomas Schaefnner, Mainz (DE); Debra Jean Waite, Clayton, NC (US); Dirdre Ann Wessel, Raleigh, NC (US); Dan Wingard, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 205 days.

This patent is subject to a terminal disclaimer.

(21) Appl. No.: 13/650,885

(22) Filed: Oct. 12, 2012

(65) Prior Publication Data
US 2014/0046918 A1  Feb. 13, 2014

Related U.S. Application Data

(63) Continuation of application No. 13/569,020, filed on Aug. 7, 2012.

(51) Int. Cl.
*G06F 17/30* (2006.01)

(52) U.S. Cl.
USPC ........... 707/609; 709/221; 709/226; 713/100; 718/104

(58) Field of Classification Search
USPC .................. 707/609; 709/221, 226; 713/100; 718/104
See application file for complete search history.

(56) References Cited

U.S. PATENT DOCUMENTS

| 5,379,423 A * | 1/1995 | Mutoh et al. ......................... 1/1 |
| 7,574,368 B2 | 8/2009 | Pawlikowski et al. |
| 2002/0156904 A1 * | 10/2002 | Gullotta et al. ............... 709/229 |

(Continued)

OTHER PUBLICATIONS ip.com et al.; "Method and Device for Secure Carrying Capacity on Demand Entitlements Forward From One Computer System to Another on Machine Hardware Upgrades", Jun. 4, 2009.

(Continued)

*Primary Examiner* — Monica Pyo
(74) *Attorney, Agent, or Firm* — Cahn & Samuels, LLP (57) ABSTRACT

An embodiment of the invention provides a method for recording, managing and tracking changes to objects in a computer system. A master record is created for the computer system; and, a transactional record is created for an object in the computer system. The master record includes the current status of the object and the current status for all objects associated to the object. The transactional record is updated in the electronic database; and, the master record is updated when the transactional record is updated. The master record is linked to all of the transactional records of the objects associated to the object with the processor. The master record is updated with the processor when a transactional record of the objects associated to the object is updated or added.

16 Claims, 7 Drawing Sheets

(56) References Cited

U.S. PATENT DOCUMENTS

| | | |
|---|---|---|
| 2002/0169876 A1* | 11/2002 | Curie et al. ................ 709/226 |
| 2004/0215278 A1 | 10/2004 | Stegink et al. |
| 2007/0073601 A1 | 3/2007 | Holton |
| 2009/0083533 A1 | 3/2009 | Axnix et al. |
| 2009/0112739 A1 | 4/2009 | Barassi et al. |
| 2009/0187629 A1 | 7/2009 | Chakra et al. |
| 2009/0187751 A1 | 7/2009 | Axnix et al. |
| 2010/0309506 A1 | 12/2010 | Reitz |
| 2011/0055826 A1 | 3/2011 | Vidal et al. |
| 2011/0078198 A1 | 3/2011 | Lee et al. |
| 2011/0289497 A1 | 11/2011 | Kiaie et al. |
| 2011/0302661 A1 | 12/2011 | Dunkeld et al. |

OTHER PUBLICATIONS ip.com et al. ; "Tool Cabinet Automated Serial Number Tracking System", Feb. 3, 2011.

\* cited by examiner

MACHINE CHANGE HISTORY TRACKING PROCESS FOR ERP APPLICATIONS

This patent application is a continuation application of U.S. patent application Ser. No. 13/569,020 filed on Aug. 7, 2012, which is hereby incorporated by reference.

BACKGROUND

The present invention is in the field of systems, methods, and computer program products for a machine change history tracking process for enterprise resource planning (ERP) applications.

Many modern technology systems such as computers, web servers, telephone switches, Internet routers, test equipment, manufacturing control systems, etc., are configurable as to their electronic, mechanical and software components. For example, a personal computer is configurable to meet the needs of the user or customer by adding circuit cards (e.g., PCI or EISA graphics cards, LAN interface cards, etc.), additional integrated circuits in sockets (e.g. memories, coprocessors, etc.), software components (e.g. application programs, drivers, utilities, etc.), and even mechanical components (e.g. panels, covers, brackets, etc.). Many products adopt configurable architectures to enable modular assembly techniques, cost reduction, and field upgradability.

SUMMARY OF THE INVENTION

An embodiment of the invention provides a method for recording, managing and tracking life cycle changes to objects in a computer system, wherein the objects are hardware components of the computer system. A master record is created for the computer system; and, a transactional record is created for an object in the computer system. The master record includes the current status of the object and the current status for all objects associated to the object. The objects associated to the object include all of the objects that are connected to the object and/or all of the objects that are affected by a change to the object. The creating of the transactional record includes setting the status of the object to ordered, shipped to the recipient, received by the recipient, installed on the computer system, removed from the computer system, deactivated, or lost on the computer system. The master record and the transactional record are stored in an electronic database; and, the transactional record is linked to the master record in the electronic database.

The transactional record is updated in the electronic database, which includes changing the status of the object to shipped to the recipient, received by the recipient, installed on the computer system, removed from the computer system, deactivated, or lost on the computer system. The master record is updated when the transactional record is updated, wherein the master record is updated in the electronic database with a processor. The master record is linked to all of the transactional records of the objects associated to the object with the processor. The master record is updated with the processor when a transactional record of the objects associated to the object is updated or added.

Another embodiment of the invention provides a system for recording, managing and tracking life cycle changes to objects in a computer system, wherein the objects include hardware components of the computer system. The system includes a records generator for creating a master record for the computer system and a transactional record for the master record. The master record includes the current status of the object and the current status for all objects associated to the object. The objects associated to the object include all objects that are connected to the object and/or all objects that are affected by a change to the object. The transactional record includes the status of an object in the computer system, wherein the status of the object includes ordered, shipped to the recipient, received by the recipient, installed on the computer system, removed from the computer system, deactivated, or lost on the computer system. An electronic database is connected to the records generator, wherein the electronic database stores the master record and the transactional record, and wherein the transactional record is linked to the master record in the electronic database.

A computer processor is connected to the electronic database, wherein the computer processor updates the transactional record and updates the master record when the transactional record is updated. The transactional record is updated to change the status of the object to shipped to the recipient, received by the recipient, installed on the computer system, removed from the computer system, deactivated, or lost on the computer system. The computer processor links the master record in the electronic database to all transactional records of objects associated to the object and updates the master record when a transactional record of the objects associated to the object is updated or added.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

An embodiment of the invention supports a flexible hardware alteration process (e.g., upgrade, downgrade) with the use of individual transactional serial tracking records (e.g., installed base records) to track each new alteration against the serial number. In addition, a durable object is used to "hold" the transactional serial tracking records, and maintain the linkages between the records and other objects (e.g., service contracts, warranties, fixed assets, custom associations, and counters). The approach and the implementation of the methods herein support multiple domains throughout the enterprise, such as, for example, customer relationship front-ends, back-end fulfillment, etc. An embodiment of the invention includes not only the concept but the code and future implementation in support of this approach. A life-cycle source of data is held for the machine supporting the entire business process. One source is provided for the inventory services functions to pull information (e.g., configuration data; status for past (history), present (installed) and future (on-order, shipped) information for the next upgrade starting point; as well as other service requirements (e.g., maintenance functions)).

Figure 1:
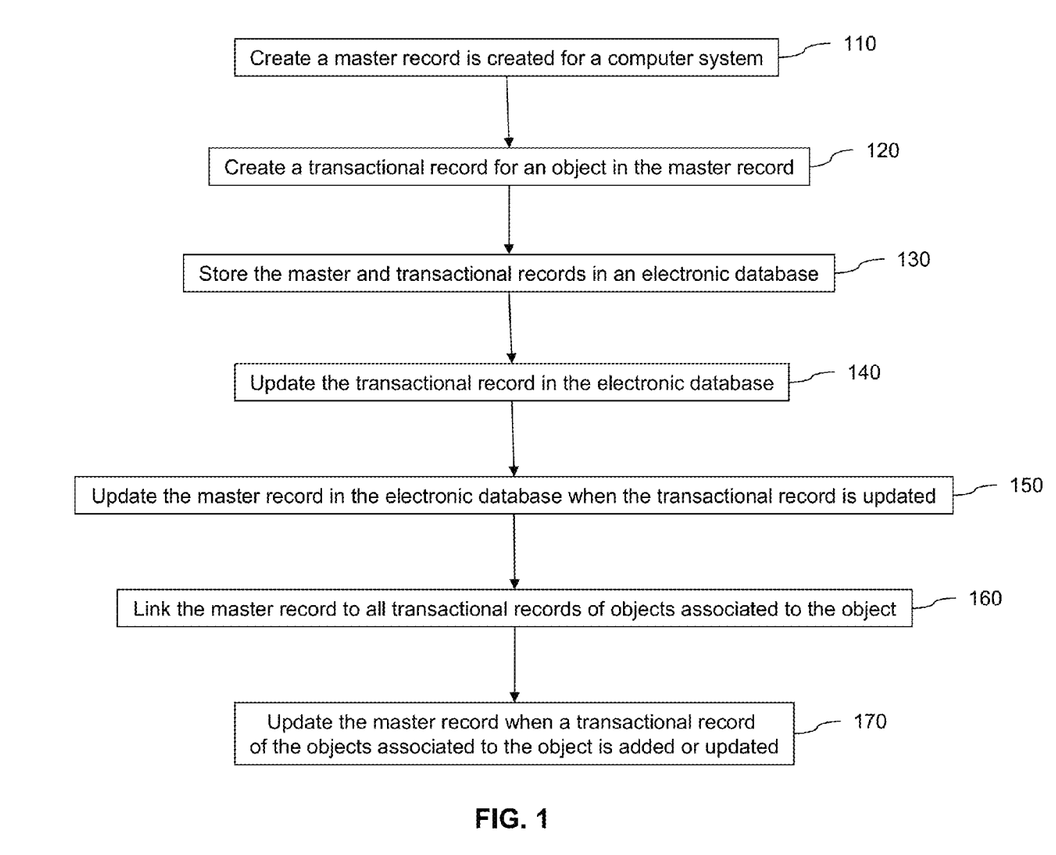
FIG. 1 is a flow diagram illustrating a method for recording, managing and tracking life cycle changes to objects in a computer system according to an embodiment of the invention.

FIG. 1 is a flow diagram illustrating a method for recording, managing and tracking life cycle changes to objects (including physical and virtual assets) in a computer system according to an embodiment of the invention. A master record is created for a computer system 110; and, a transactional record is created for the object in the master record 120. The transactional record is created for an object (also referred to herein as a "box" or "asset") in the computer system. As used herein, the term "object" refers to a hardware and/or software component of the computer system. For example, in one embodiment, an object is a server and its physical and non-physical attributes include the number of CPUs, type of CPUs, internal memory, internal storage, color, voltage, language, enclosures, add-on frames, and/or manufacturing specifications. In another embodiment, an asset is a software program and its physical and non-physical attributes include a license, license type, number of users, physical media, language, and/or support. In yet another embodiment, for example, the computer system is a desktop computer; and, the objects include a hard drive, mouse, keyboard, printer, and scanner.

The transactional record includes the status of the object. Thus, the creation of the transactional record can include setting the status of the object to ordered, shipped to the recipient, received by the recipient, installed on the computer system, removed from the computer system, deactivated, and/or lost on the computer system. In at least one embodiment, the transactional record is created outside of the master record, wherein the transaction record is linked to the master record.

The master record and transactional record are electronic files that are stored in an electronic database 130. The transactional record is updated in the electronic database 140. This can include changing the status of the object to shipped to the recipient, received by the recipient, installed on the computer system, removed from the computer system, deactivated, and/or lost on the computer system. In at least one embodiment, the transactional record is updated via a computer processor.

Each transactional record represents a single upgrade to an object in the asset or computer system. The upgrade can be a hardware component added to the object, or a new object replacing the object. The transactional record includes the status of the upgrade (e.g., ordered, shipped to the recipient). The master record can include the current status of the object (e.g., a transactional record for a sound card) and the current status for all of the objects associated to the object (e.g., speakers, webcam, microphone). In another example according to an embodiment of the invention, the object is a server; and, the objects associated to the object include the number of CPUs, the type of CPUs, internal memory, internal storage, color, voltage, language, enclosures, add-on frames, and/or manufacturing specifications. In yet another example, the object is a software program; and, the objects associated to the object include a license, license type, number of users, physical media, language, and/or support. In still another example, the object is a network processor; and, the objects associated to the object include network options, number of lines, etc. The objects (i.e., subordinate records) that are "associated to" the object (i.e., subordinate records) can include all of the objects that are connected to the object and/or all of the objects (i.e., subordinate records) that are affected by a change (e.g., upgrade) to the object. As used herein, the term "connected" includes operationally connected, logically connected, in communication with, physically connected, engaged, coupled, contacts, linked, and attached.

The master record is updated in the electronic database when the transactional record is updated 150 (e.g., with the processor). In at least one embodiment, the updating of the master record includes deactivating the transactional record when an upgrade is installed on the object, and activating a second transactional record for the object, wherein the second transactional record indicates the installation of the upgrade. For example, the master record for a laptop computer is updated when a memory device on the laptop computer is upgraded. The transactional record for the original (manufacturer installed) laptop configuration is deactivated when a new memory card is installed on the memory device. The deactivated transactional record is replaced by a transactional record which includes the new memory card.

The master record can be further updated after a subsequent upgrade. This includes deactivating the second transactional record of the object when a new upgrade is installed on the object, and activating a third transactional record for the object, wherein the third transactional record indicates the installation of the new upgrade. In the preceding example, the previous transactional record would be deactivated and replaced when the newest memory card is installed on the laptop. The deactivated transactional record is replaced by a newer transactional record indicating the newest memory card.

The master record is linked to all transactional records of objects associated to the object 160. For example, the master record for a laptop computer is linked to all of the transactional records of objects that are associated to the memory device, i.e., all of the transactional records of the various upgrades (e.g., memory devices, hard disks, adapter cards, and/or channels on the laptop computer). As used herein, the term "linked" refers to associating or connecting one item to another item.

The master record is updated when a transactional record of the objects associated to the object is added or updated to specific states (e.g. installed, removed) 170. Thus, the master record for the laptop computer is updated when the transactional object is updated to specific states (e.g., installed, removed) or the characteristics are modified.

In at least one embodiment of the invention, the master record is linked to all the master records of all peripheral objects associated to the original object, wherein the master record is updated when a master record of the objects associated to the object is changed or added. Thus, for example, the master record for a server is updated when master records for configurable software or hardware peripherals associated to the server are updated. In at least one embodiment, the master record is linked and/or updated via the processor.

In another embodiment, object records are linked to the master record and/or the transactional records, wherein the object records include service contracts, capacity usage, technical documents, photographs, and/or warranty information for the computer system and/or objects.

The following provides a high level process design for machine or product change history tracking according to an embodiment of the invention. The design can utilize a product nomenclature which includes delta and target configurations to show the specific upgrade delta and the current machine target configurations. Pricing can be performed based on the delta features or options, which specify the upgraded items. Each history based upgrade is handled as a new transactional serial number tracking record (i.e., install base record), which is created with the status "on-order" at order time. There is also a durable serial number tracking record, which holds the transactional records, is an anchor for subsequent changes, and represents the cumulative impact of the various changes. The statuses of installed base records can be updated upon shipment, and then upon installation. The latest installed upgrade install base record becomes the active record, thereby deactivating the previous record. The various records linked to the serial number tracking record (e.g., service contracts, warranty, fixed assets, custom associations, and counters) are linked to the durable serial number tracking record, and therefore are not required to be adjusted at the install event. Stacked upgrades (sequential upgrades taken before the previous upgrade has been shipped and/or installed, i.e., in all statuses) are supported with the various install base records (base and upgrades), which are linked as dependencies, each having their own status. The use of additional grouping tools builds the umbrella (hierarchy) for the durable object and the transactional objects. Inventory retrieval functions and applications reference the install base to retrieve current inventory and on-order information. Machine indicated content (the configuration that the machine determines for itself) is also utilized by the inventory retrieval functions for reconciliation. Accordingly, the process design supports the full set of requirements for "base not yet installed" and "stacked upgrades". Moreover, the durable serial number tracking record helps maintain a single repair record for the history of the machine, holding the multiple changes.

Figure 2A:
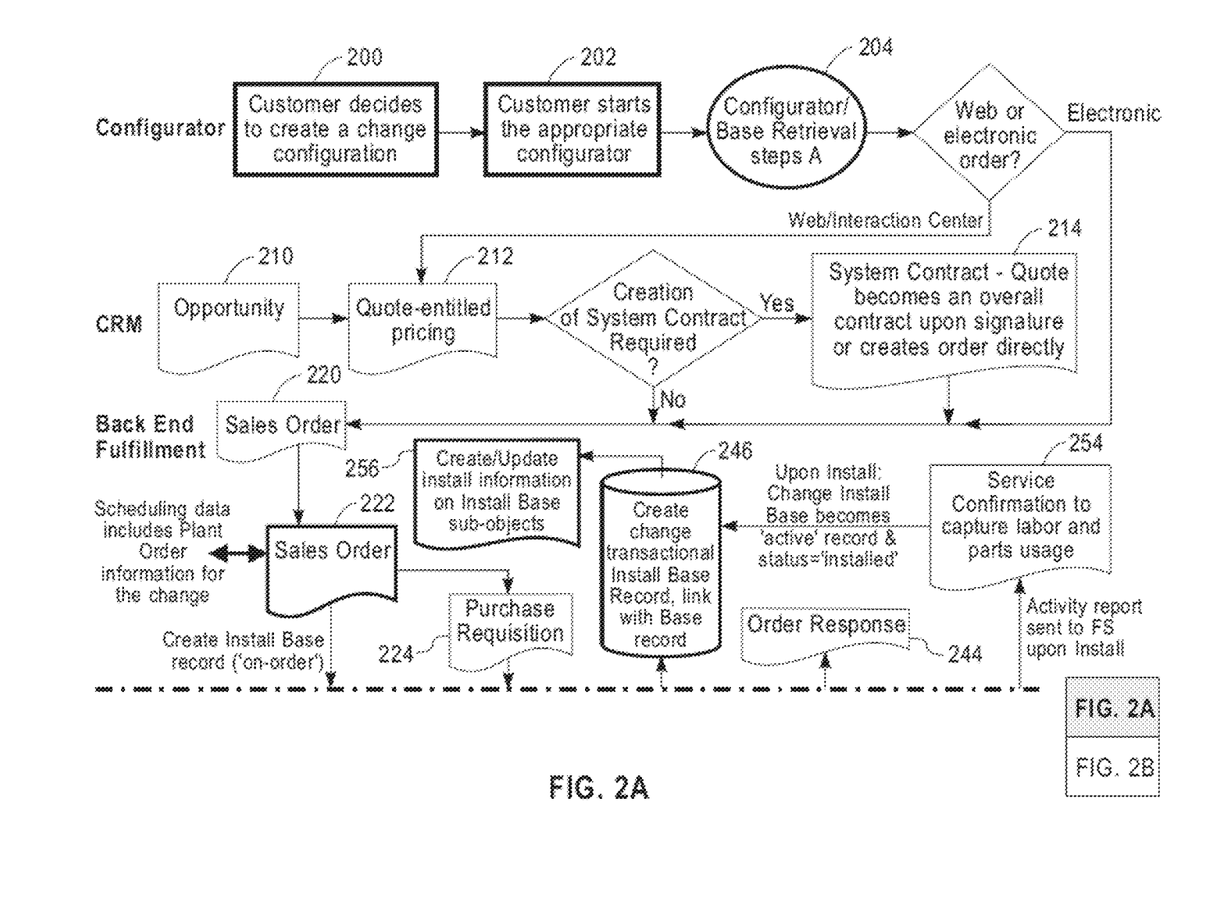
FIGS. 2A and 2B illustrate a flow diagram for a machine or product change history tracking process according to an embodiment of the invention.
Figure 2B:
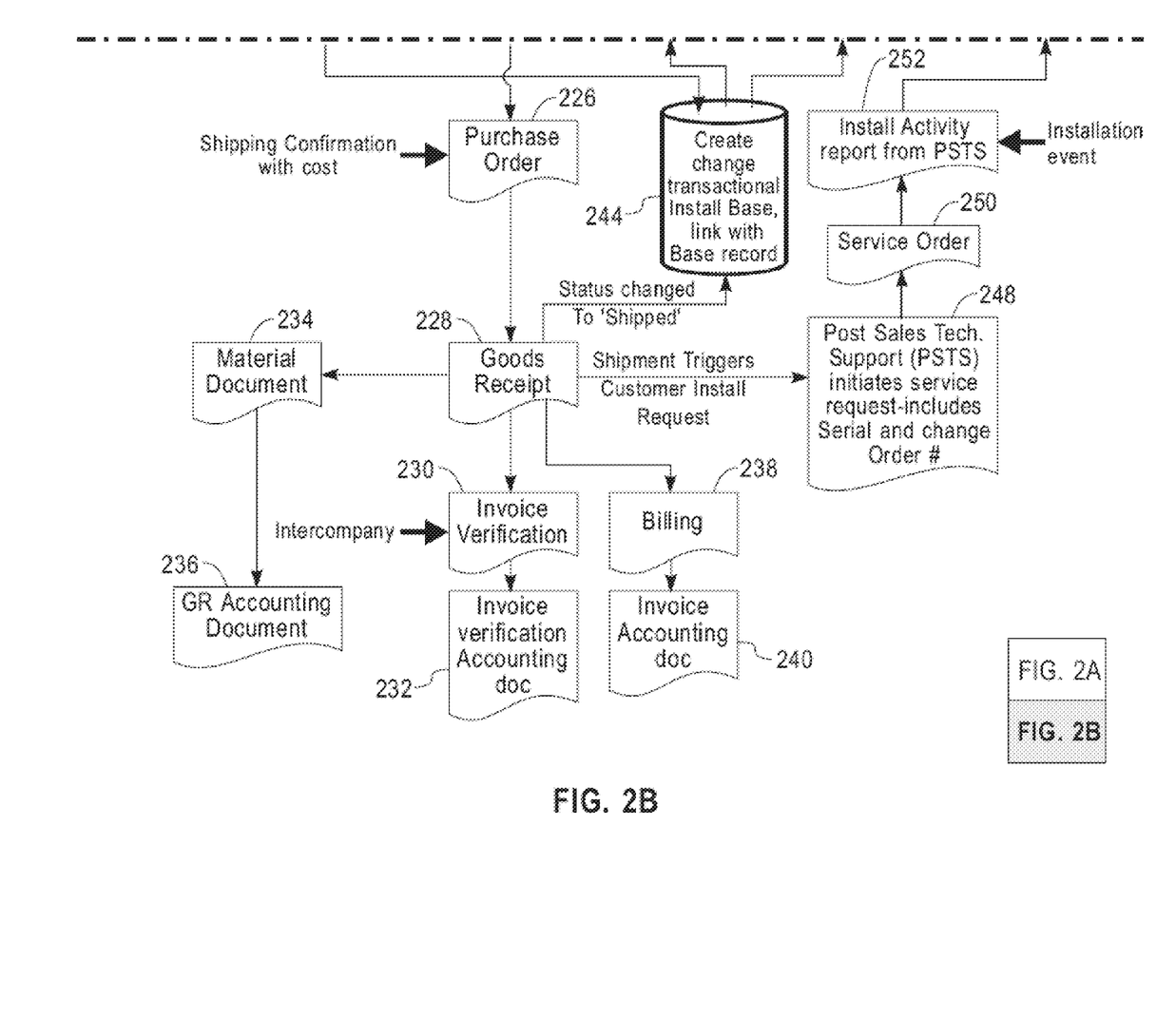

FIGS. 2A and 2B illustrate a process flow for machine or product change history tracking according to an embodiment of the invention, wherein a new alteration (e.g., upgrade, downgrade, delta) transactional record is created for each new change for that serial number, to track history based upgrades. The various change scenarios generate different requirements and require a different kind of solution in the ERP system, and touches the end-to-end (E2E) value chain for many sub-processes and business objects, including configurators, quotes, pricing, contracts, order management, installed bases, delivery, installation, warranties, fixed assets, billing, finance, returns, etc.

FIGS. 2A and 2B illustrate a flow diagram for a machine or product change history tracking process showing customer relationship manager (CRM), front-end, and back-end fulfillment applications according to an embodiment of the invention. A customer (or internal user) decides to create a change configuration and reviews information from the IBase (also referred to herein as the "electronic database") 200. The IBase shows an associated view of the base object and upgrades, as well as the status of each. In at least one embodiment, the IBase includes all of the durable and transactional records for the computer system to be changed.

The customer (or internal user) starts the change configuration by using inventory services functions that reference the IBase to retrieve the current inventory, on-order information, and any machine-sensed data (i.e., what the computer system says it has) 202. The information retrieved from the IBase can be used as the starting point for the change configuration.

The starting point is provided to the configurator 204. In one embodiment, the configurator is a hardware component that understands the computer system components (e.g., compatibility issues, component requirements) and performs the technical upgrades. If an electronic order is performed, then a sales order is created. If a web order is performed, a quote is provided by the CRM 212 based on the web order opportunity 210. If the creation of a system contract is required, then the quote becomes an overall contract upon signature, from which the order is created directly 214. If a system contract is not required, then a sales order (with change line item) is created 220.

The scheduling data for the sales order includes plant order information for the change 222. The sales order functions can include checking that the configuration change's starting point is valid against the latest IBase target. It can also provide various information required by the IBase, including the new delta and target configurations, which allows for IBase integrity. A purchase order is created 226 from the purchase requisition 224, which includes shipping information with cost. A goods receipt is created 228, the invoice is verified (intercompany) 230, and an invoice verification accounting document is created 232. A material document can be created based on the goods receipt 234, and a goods receipt (GR) accounting document can be created based on the material document 236. The goods receipt can be sent to billing 238, where an invoice accounting document can be created 240. Based on the goods receipt, the status of the ordered object can be changed to "shipped". Shipment can trigger a customer install request.

The sales order can be used to create an install base record (e.g., "on order"). A change transactional install base is created and linked with the base record 242. Upon the initial "new box" order, both a durable object (also referred to herein as the "durable record" or "master record") and a transactional object are created (also referred to herein as the "serial number tracking record" or "transactional record") on the order of the initial base record. The durable record, which holds the transactional records, is an anchor for subsequent changes, and represents the cumulative impact of the various changes. Each history based upgrade is handled as a new transactional serial number tracking record (i.e. install base record), which is created with the status "on-order" at order time, and tracks the status of that particular upgrade. An order response is sent 244.

A change transactional install base record is created and linked with the base record 246. The durable and transactional objects are replicated to a CRM front-end for inventory retrieval functions/applications to reference the install base to retrieve current inventory and on-order information, customer ad hoc retrieval of installed base information, and/or service entitlement and maintenance functions.

Based on a customer install request, post sales technical support (PSTS) initiates a service request, which can include a serial and change order number 248. A service order is created 250; and, install activity report is received from the PSTS 252 at the installation event. The install activity report is sent to the fulfillment system (FS) upon installation; and, a service confirmation is created to capture labor and parts usage 254.

The installed base records' statuses are updated upon shipment (e.g., "shipped"), and then upon installation (e.g., "installed"). The latest installed Upgrade Install Base record becomes the active record, 'de-activating' the previous record. The various records linked to the serial number tracking record (e.g., service contracts, warranty, fixed assets, custom associations, and 'counters') are linked to the durable record 256, and therefore are not required to be adjusted at the install event.

Figure 3:
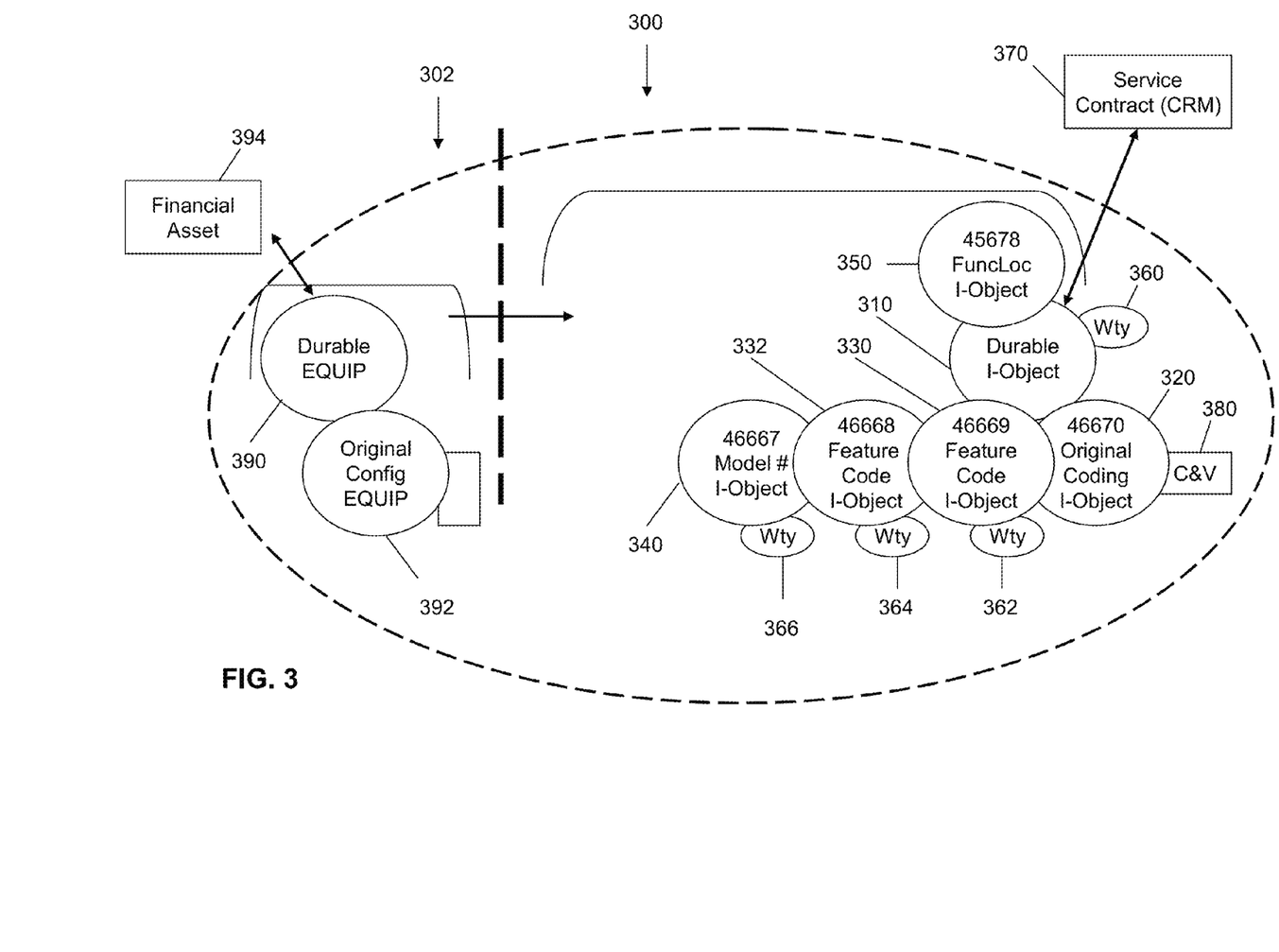
FIG. 3 illustrates systems including durable objects, transactional objects, and other objects according to an embodiment of the invention.
Figure 4:
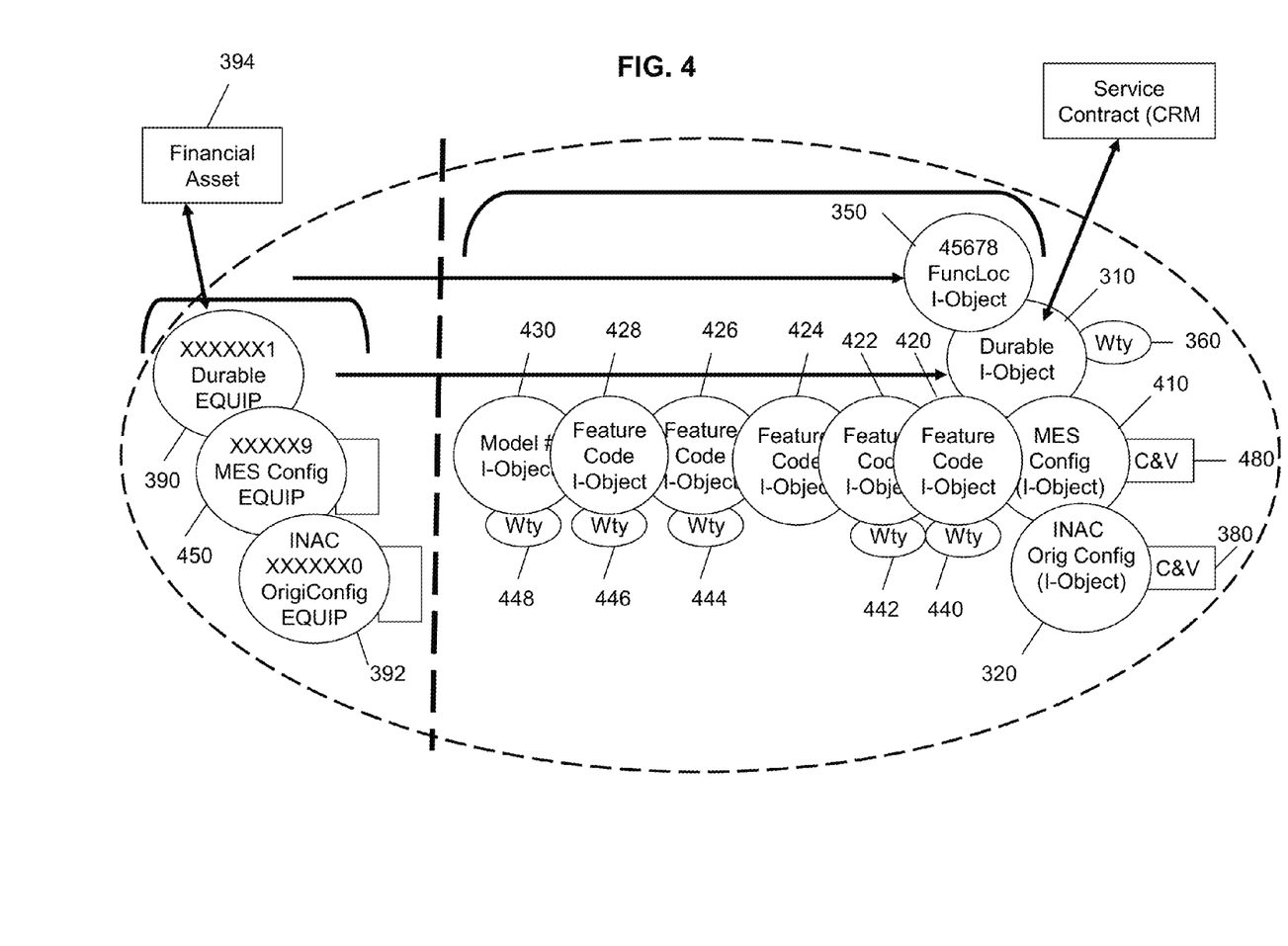
FIG. 4 illustrates the systems illustrated in FIG. 3 after a modification according to an embodiment of the invention.

FIGS. 3 and 4 show the setup and relationship of the individual transactional serial tracking records (e.g., installed base records) to track each new upgrade against the serial number. In addition, the durable object holds the transactional objects and maintains the linkages between the records and other objects (e.g., service contracts, warranty, fixed assets, custom associations, and counters).

FIG. 3 illustrates durable objects, transactional objects, and other objects according to an embodiment of the invention. More specifically, a durable object 310 and an original transaction object 320 are created when the new box is ordered, wherein the original transaction object 320 is connected to the durable object 310. Feature objects 330, 332, a model object 340, and a functional object 350 are also connected to the durable object 310. The feature objects 330, 332 and model object 340 are subcomponents describing both durable and transactional objects. The functional object is a grouping tool that allows future changes to be associated to the existing master record.

In at least one embodiment, warranty information 360, 362, 364, and 366 are connected to the durable object 310, the feature objects 330, 332, and the model object 340. A service contract 370 can also be connected to the durable object 310. Furthermore, characteristics and values data 380 can be connected to the original transaction object 320.

In at least one embodiment of the invention, the durable object 310, original transaction object 320, feature objects 330, 332, and model object 340 are stored in a first system 300, for example, a customer relationship manager; and, a second durable object 390 connected to an original transaction object 392 are stored on a second system 302, for example, a enterprise core component. In at least one embodiment, the second durable object 390 is identical to the durable object 310; and, the original transaction object 392 is identical to the original transaction object 320. A financial asset 394 can also be connected to the corresponding durable object 390 (the corresponding durable object (e.g., the second durable object)) in the back-end system.

FIG. 4 illustrates the systems illustrated in FIG. 3 after an alteration (e.g., upgrade or downgrade) according to an embodiment of the invention. The durable objects and the sub-components (e.g., feature objects) keep the relationships to the other objects (e.g., warranty information). There are new transactional serial tracking records tracking the upgrade. More specifically, after an upgrade, a transactional object 410 is connected to the durable object 310; and the original transaction object 320 is deactivated. Feature objects 420, 422, 424, 426, and 428 and a model object 430 are connected to the durable object 310 via the transactional object 410. In at least one embodiment, warranty information 440, 442, 444, 446, and 448 are connected to the model object 430 and feature objects 420, 422, 426, and 428; and characteristics and values data 480 is connected to the transactional object 410. In the second system 302, a transaction object 450 is connected to the corresponding durable object 390 (the corresponding durable object (e.g., second durable object)) in the back-end system; and, the original transaction object 392 is deactivated.

Figure 5:
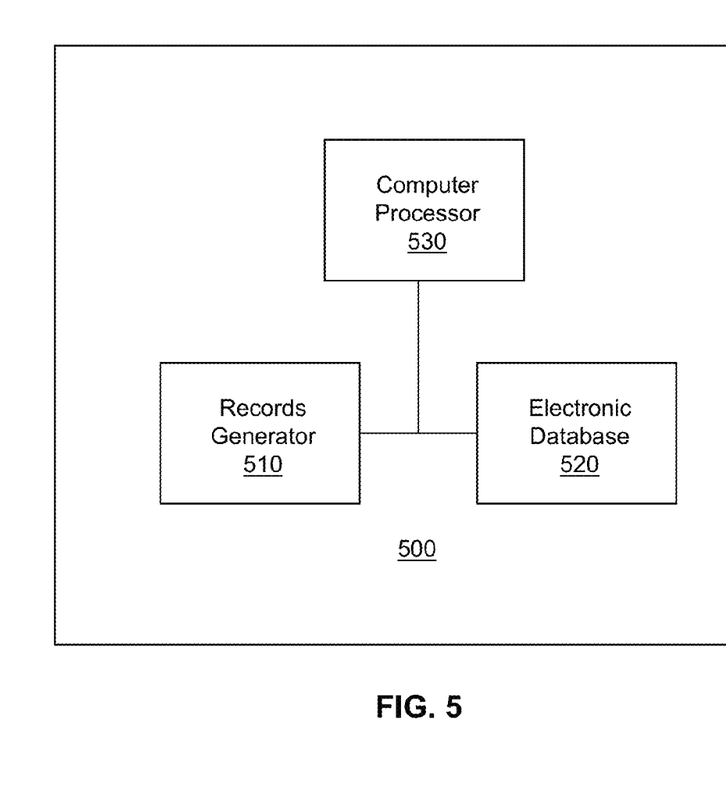
FIG. 5 illustrates a system for recording, managing and tracking life cycle changes to objects in a computer system according to an embodiment of the invention.

FIG. 5 illustrates a system 500 for recording, managing and tracking life cycle changes to objects in a computer system according to an embodiment of the invention. The objects can be hardware and/or software components of the computer system. The system 500 is separate and distinct from the computer system, although the system 500 can be connected to the computer system. The system 500 includes a records generator 510, an electronic database 520, and a computer processor 530. The records generator 510 creates a master record for the computer system and a transactional record. The master record includes the current status of the object and the current status for all objects associated to the object, wherein the objects associated to the object include all objects that are connected to the object and/or all objects that are affected by a change to the object. The transactional record includes the status of an object in the computer system. The status of the object can include: ordered, shipped to the recipient, received by the recipient, installed on the computer system, removed from the computer system, deactivated, or lost on the computer system.

The electronic database 520 is connected to the records generator 510, wherein the electronic database 520 stores the master record and the transactional record. The transactional record can be linked to the master record in the electronic database and/or the transactional record can be a part of the master record.

The computer processor 530 is connected to the electronic database 520, wherein the computer processor 530 updates the transactional record and updates the master record when the transactional record is updated. The transactional record can be updated to change the status of the object to: shipped to the recipient, received by the recipient, installed on the computer system, removed from the computer system, deactivated, or lost on the computer system. The computer processor can link the master record in the electronic database 520 to all transactional records of objects associated to the object and update the master record when a transactional record of the objects associated to the object is updated or added.

The computer processor 530 deactivates the transactional record when an upgrade is installed on the object; and, the records generator 510 creates and activates a second transactional record for the object in the electronic database 520, wherein the second transactional record indicates the installation of the upgrade. In at least one embodiment of the invention, the second transactional record is activated by the computer processor 530. As used herein, the term "upgrade" includes adding a new component to the object and/or replacing a present object with a new object. In at least one embodiment, the computer processor 530 receives a notification from the computer system that the upgrade has been installed. In another embodiment, the computer processor 530 detects the installation of an upgrade without notification from the computer system. In at least one embodiment, the records generator 510 creates a plurality of template transactional records, wherein one of the transactional records includes the current status of the object and is activated. When an upgrade is installed, the previously activated transactional record is deactivated and one of the template transactional records is activated and includes the current status of the object (indicating the installed upgrade). The computer processor 530 deactivates the second transactional record of the object when a new upgrade is installed on the object. The computer processor 530 or records generator 510 activates a third transactional record for the object, wherein the third transactional record indicates the installation of the new upgrade. Each transactional record linked to the master record can represent a single upgrade to an object in the computer system, wherein the transactional record includes a status of the upgrade.

In at least one embodiment of the invention, the computer processor 530 links the master record to all master records of the objects associated to the object, and updates the master record when a master record of the objects associated to the object is changed or added. The computer processor 530 can also link object records to the master record, wherein the object records include service contracts, capacity usage, technical documents, photographs, and/or warranty information.

As will be appreciated by one skilled in the art, aspects of the present invention may be embodied as a system, method or computer program product (e.g., on a server separate from the computer system). Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, portable computer diskette, hard disk, random access memory (RAM), read-only memory (ROM), erasable programmable read-only memory (EPROM or Flash memory), optical fiber, portable compact disc read-only memory (CD-ROM), optical storage device, magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of at least one programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
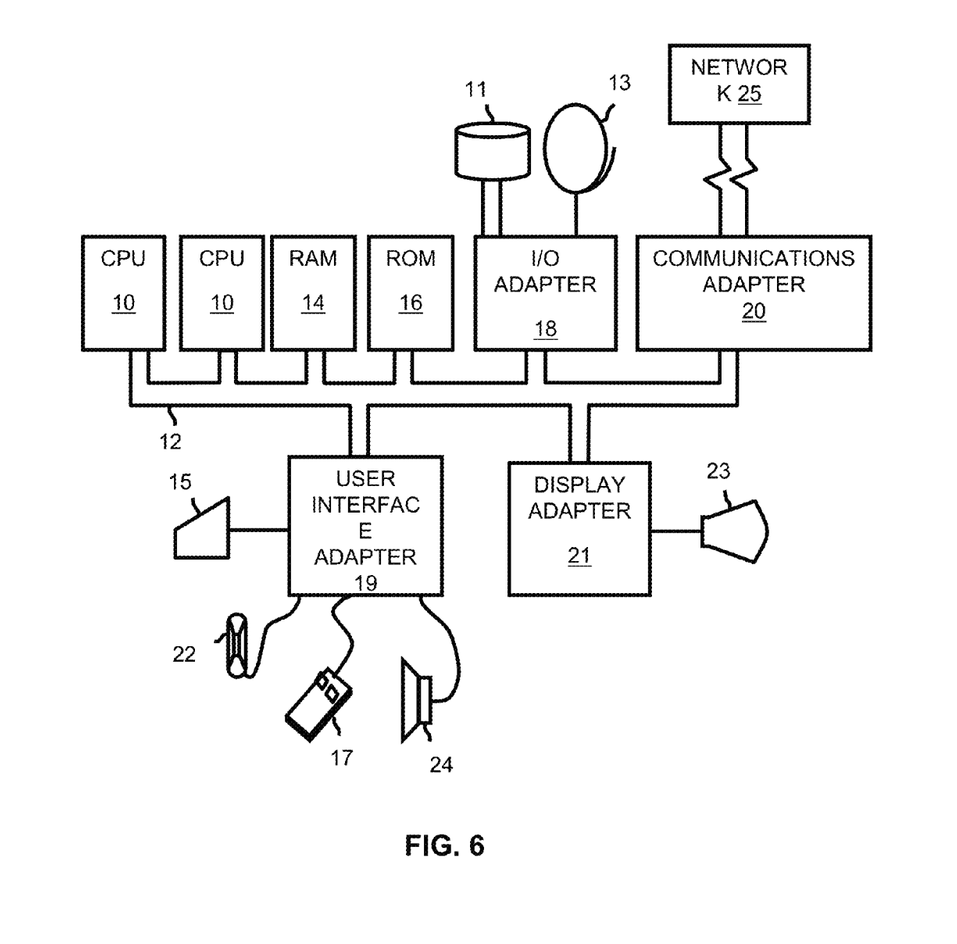
FIG. 6 illustrates a computer program product according to an embodiment of the invention.

Referring now to FIG. 6, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for recording, managing and tracking life cycle changes to objects in at least one computer system, the objects comprising hardware components of the computer system, said system comprising:
    a records generator for creating a master record for the computer system and a transactional record,
        the master record including a current status of the object and a current status for all objects associated to the object,
        the transactional record including a status of an object in the computer system, the status of the object including one of: ordered, shipped to the recipient, received by the recipient, installed on the computer system, removed from the computer system, deactivated, and lost on the computer system;
    an electronic database connected to said records generator, said electronic database stores the master record and the transactional record, the transactional record being linked to the master record in said electronic database; and
    a computer processor connected to said electronic database, said computer processor updates the transactional record and updates the master record when the transactional record is updated, wherein said computer processor: deactivates the transactional record when an upgrade is installed on the object; and activates a second transactional record for the object, the second transactional record indicating the installation of the upgrade, the transactional record being updated to change the status of the object to one of: shipped to the recipient, received by the recipient, installed on the computer system, removed from the computer system, deactivated, and lost on the computer system,
    said computer processor links the master record in said electronic database to all transactional records of objects associated to the object and updates the master record when a transactional record of the objects associated to the object is one of updated and added.

2. The system according to claim 1, wherein said computer processor:
    deactivates the second transactional record of the object when a new upgrade is installed on the object; and
    activates a third transactional record for the object, the third transactional record indicating the installation of the new upgrade.

3. The system according to claim 1, wherein the objects associated to the object comprise at least one of all objects that are connected to the object and all objects that are affected by a change to the object.

4. The system according to claim 1, wherein said computer processor:
    links the master record to all master records of the objects associated to the object; and
    updates the master record when a master record of the objects associated to the object is changed or added.

5. The system according to claim 1, wherein each transactional record in the master record represents a single upgrade to an object in the computer system, and wherein the transactional record includes a status of the upgrade.

6. The system according to claim 1, wherein said computer processor links object records to the master record, the object records including at least one of service contracts, capacity usage, technical documents, photographs, and warranty information.

7. A system for recording, managing and tracking life cycle changes to objects in at least one computer system, the objects comprising hardware components of the computer system, said system comprising:
    a records generator for creating a master record for the computer system and a transactional record,
        the master record including a current status of the object and a current status for all objects associated to the object, the objects associated to the object comprising at least one of all objects that are connected to the object and all objects that are affected by a change to the object,
        the transactional record including a status of an object in the computer system, the status of the object including one of: ordered, shipped to the recipient, received by the recipient, installed on the computer system, removed from the computer system, deactivated, and lost on the computer system;
    an electronic database connected to said records generator, said electronic database stores the master record and the transactional record, the transactional record being linked to the master record in said electronic database; and
    a computer processor connected to said electronic database, said computer processor updates the transactional record and updates the master record when the transactional record is updated, wherein said computer processor: deactivates the transactional record when an upgrade is installed on the object; and activates a second transactional record for the object, the second transactional record indicating the installation of the upgrade, the transactional record being updated to change the status of the object to one of: shipped to the recipient, received by the recipient, installed on the computer system, removed from the computer system, deactivated, and lost on the computer system, said computer processor links the master record in said electronic database to all transactional records of objects associated to the object and updates the master record when a transactional record of the objects associated to the object is one of updated and added.

8. The system according to claim 7, wherein said computer processor:
deactivates the second transactional record of the object when a new upgrade is installed on the object; and
activates a third transactional record for the object, the third transactional record indicating the installation of the new upgrade.

9. The system according to claim 7, wherein said computer processor:
links the master record to all master records of the objects associated to the object; and
updates the master record when a master record of the objects associated to the object is one of changed and added.

10. The system according to claim 7, wherein each transactional record linked to the master record represents a single upgrade to an object in the computer system, and wherein the transactional record includes a status of the upgrade.

11. The system according to claim 7, wherein said computer processor links object records to the master record, the object records including at least one of service contracts, capacity usage, technical documents, photographs, and warranty information.

12. A computer program product for recording, managing and tracking life cycle changes to objects in a computer system separate from said computer program product, the objects comprising hardware components of the computer system, said computer program product comprising:
a computer readable storage device;
first program instructions to create a master record for a computer system;
second program instructions to create a transactional record in the master record, the transactional record being created for an object in the computer system, said creating of the transactional record including setting a status of the object;
third program instructions to store the master record and the transactional record in an electronic database;
fourth program instructions to update the transactional record in the electronic database, said updating of the transactional record including changing the status of the object;
fifth program instructions to update the master record when the transactional record is updated, the master record being updated in the electronic database with a processor, wherein said fifth program instructions: deactivates the transactional record when an upgrade is installed on the object; and activates a second transactional record for the object, the second transactional record indicating the installation of the upgrade;
sixth program instructions to link the master record to all transactional records of objects associated to the object with the processor; and
seventh program instructions to updating the master record with the processor when a transactional record of the objects associated to the object is one of updated and added,
said first program instructions, said second program instructions, said third program instructions, said fourth program instructions, said fifth program instructions, said sixth program instructions, and said seventh program instructions are stored on said computer readable storage medium.

13. The computer program product according to claim 12, wherein said fifth program instructions:
deactivates the second transactional record of the object when a new upgrade is installed on the object; and
activates a third transactional record for the object, the third transactional record indicating the installation of the new upgrade.

14. The computer program product according to claim 12, wherein the objects associated to the object comprise at least one of all objects that are connected to the object and all objects that are affected by a change to the object.

15. The computer program product according to claim 12, wherein the master record includes a current status of the object and a current status for all objects associated to the object.

16. The computer program product according to claim 12, further comprising:
eighth program instructions to link the master record to all master records of the objects associated to the object; and
ninth program instructions to update the master record when a master record of the objects associated to the object is changed or added.

* * * * *